United States Patent [19]
Takahashi et al.

[11] Patent Number: 6,111,333
[45] Date of Patent: Aug. 29, 2000

[54] MAGNETIC BEARING, ROTATING MACHINE MOUNTING THE SAME, AND METHOD FOR DRIVING ROTATING MACHINE

[75] Inventors: Naohiko Takahashi, Ibaraki-ken; Tsunehiro Endo, Hitachiota; Haruo Miura, Ibaraki-ken; Minoru Yoshihara, Ibaraki-ken; Yasuo Fukushima, Ibaraki-ken; Kazuki Takahashi, Ibaraki-ken, all of Japan

[73] Assignee: Hitachi, Ltd., Tokyo, Japan

[21] Appl. No.: 09/261,237

[22] Filed: Mar. 3, 1999

[30] Foreign Application Priority Data

Mar. 13, 1998 [JP] Japan ................................ 10-062521

[51] Int. Cl.[7] ........................... H02K 7/09; H02K 11/00; G05B 1/02
[52] U.S. Cl. ..................... 310/90.5; 310/68 B; 318/607; 318/608
[58] Field of Search ................................ 310/90.5, 68 B, 310/166, 51; 361/139, 143, 146, 152–154, 159; 322/47; 318/607, 608, 807

[56] References Cited

U.S. PATENT DOCUMENTS

| | | | |
|---|---|---|---|
| 4,128,795 | 12/1978 | Habermann et al. | 318/618 |
| 4,326,278 | 4/1982 | Shida et al. | 368/157 |
| 4,376,914 | 3/1983 | Kimura | 318/603 |
| 4,715,353 | 12/1987 | Koike et al. | 123/590 |
| 5,212,434 | 5/1993 | Hsieh | 318/603 |
| 5,355,040 | 10/1994 | New | 310/90.5 |
| 5,446,354 | 8/1995 | Hiruma | 318/439 |
| 5,562,528 | 10/1996 | Ueyama et al. | 451/11 |
| 5,574,349 | 11/1996 | Oh | 318/606 |
| 5,649,814 | 7/1997 | Lund-lack | 417/423.7 |
| 5,692,882 | 12/1997 | Bozeman, Jr. et al. | 417/45 |
| 5,696,412 | 12/1997 | Iannello | 310/90.5 |
| 5,736,802 | 4/1998 | Ueyama et al. | 310/90.5 |
| 5,760,510 | 6/1998 | Nomura et al. | 310/90.5 |
| 5,844,339 | 12/1998 | Schroeder et al. | 310/90.5 |

FOREIGN PATENT DOCUMENTS

| | | |
|---|---|---|
| 9-056192 | 2/1997 | Japan . |
| 9-266690 | 10/1997 | Japan . |
| 9-294391 | 11/1997 | Japan . |
| 10-023783 | 1/1998 | Japan . |

*Primary Examiner*—Nestor Ramirez
*Assistant Examiner*—Dang Dinh Le
*Attorney, Agent, or Firm*—Evenson, McKeown, Edwards & Lenahan, PLLC

[57] ABSTRACT

In a rotating machine with employment of a sensor-less DC brushless motor, a terminal voltage of a motor is corrected in a phase corrector by using a motor phase current signal. At this time, the terminal voltage is processed in an integrator and a comparator so as to be converted into an ON/OFF signal having a duty ratio of 1:1. Then, a rotation signal is produced based on an induced voltage which is generated by rotating a permanent magnet rotor, so that a rotation sensor is no longer required. On the other hand, an output derived from the phase corrector is entered as a 1-pulse/1-rotation output signal into a PLL circuit. The PLL circuit contains a phase comparator, a low-pass filter, an oscillator, and a counter. The PLL circuit frequency-divides the 1-pulse/1-rotation output signal. The sine wave data are stored into a ROM with respect to each of the frequency-divided signal positions. The unbalance vibrations of the magnetic bearing are controlled every frequency-divided signal.

9 Claims, 7 Drawing Sheets

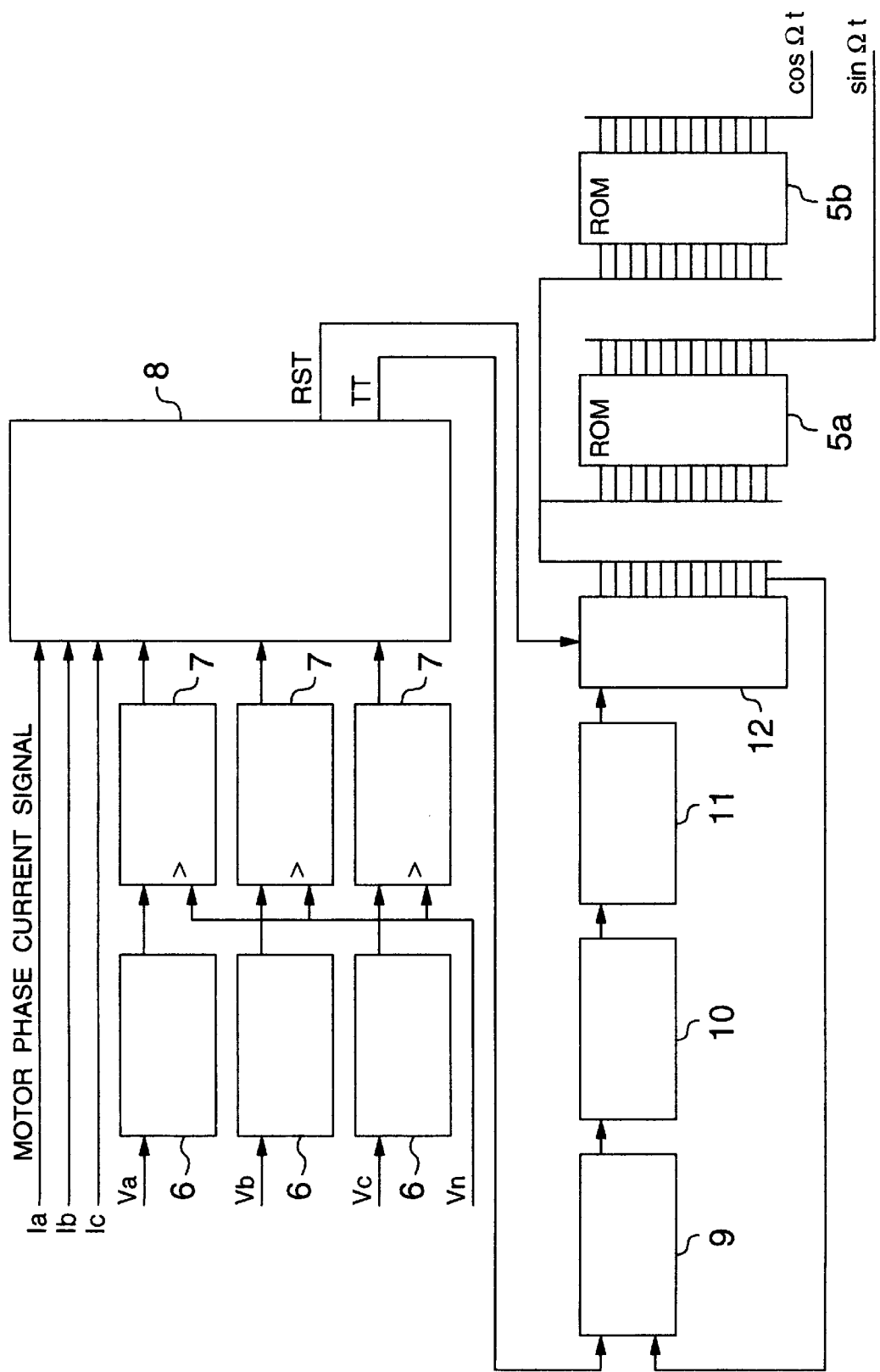

MAGNETIC BEARING, ROTATING MACHINE MOUNTING THE SAME, AND METHOD FOR DRIVING ROTATING MACHINE

BACKGROUND OF THE INVENTION

The present invention generally relates to a bearing and a rotating machine mounting such a bearing. More specifically, the present invention is directed to a magnetic bearing suitably used when a DC brushless motor is employed as a driver, and also to a rotating machine mounting such a magnetic bearing, and further to a method for driving such a rotating machine.

In highspeed rotating machines driven by DC motors, brushless motors are usually employed in order to avoid bad influences giving to operation gas when brushes of these DC motors wear, and further so as to extend maintenance cycles of the DC motors. In a brushless motor, a close relationship between positions of magnetic poles of this brushless motor and positions of windings to be energized must be established. Since output torque of a motor is produced by mutual reaction between magnetic fluxes generated from magnetic poles of a rotor and currents of windings of a stator, in a DC brushless motor, it is desirable to supply a current to a winding of such a phase located in the vicinity of such a position where the magnetic flux density produced from the magnetic poles of the rotor is maximum. In other words, the winding supplied with current is switched time to time with relation to the rotational position of a magnetic pole of the rotor. The timing of a commutation corresponding to the pole position may constitute an important factor in order to maximize the motor torque. A rotation position sensor is employed so as to detect the magnetic pole position of the rotor. A drive signal is produced based upon the rotation position information acquired from this rotation position sensor in such a manner that an in-phase relationship can be established between a basic wave of a motor current and a induced voltage. Then, the DC brushless motor is driven by this drive current.

As previously explained, the information about the rotation position is required in order to find the current commutation timing. The rotation positions of the rotor can be detected from the induction voltages produced by rotating of the permanent magnet rotor, so that there is no need to especially provide such a rotation position sensor. In accordance with this method, there are many advantages that a rotary system of a motor can be made compact and can be manufactured in low cost. Accordingly, various ideas have been proposed. These ideas are described in JP-A-9-266690, JP-A-9-56192, JP-A-9-294391, and JP-A-10-23783.

As related applications filed in the United States, there are applications filed on Feb. 13, 1998 entitled "Two-stage centrifugal compressor", and another application Ser. No. 08/921,604 filed Sep. 2, 1998 entitled "Multi-stage compressor" for disclosing mechanical structures of compressor.

To support rotors of a high speed turbo compressor, magnetic bearings are used because of such a merit that no lubricating oil is needed. In magnetic bearing type turbo compressors, rotors are supported in such a manner that the rotors are floated in air by receiving electromagnetic force. Moreover, active type magnetic bearings for generating electromagnetic force has means for detecting a displacement of a rotor along a radial direction to control the rotor position. The rotor is controlled using the detected radial displacements with so-called PID control. The PID control is a combination of proportional control, integral control and differential control. As explained above, in the case that magnetic bearings are used for rotating machines, a vibration of rotors should be considered. That is, highspeed rotors are occasionally driven beyond several orders of critical speeds. Then it is a key point to suppress vibrations excited by imbalance for operating rotors beyond critical speeds. For this reason, the exciting force having the frequency coincident with the rotational frequency of the rotor is produced by the magnetic bearing, and this exciting force may be used as the counter force with respect to the unbalanced force, so that the highspeed rotor can be driven beyond the critical speed.

In rotating machines supported by magnetic bearings and equipped with DC brushless motors, rotation position information is required so as to find the commutation at good timing. In general, rotation position sensors such as encoders or resolvers have been used. However, since the rotation position may be detected even by employing the induced voltage, it is a recent trend to use the induced voltage instead of a rotation position sensor.

For instance, when a 120-degree energizing type DC brushless motor rotates under no current in motor, an induced voltage is generated by a permanent magnet rotation. This generated induced voltage directly appears at winding terminals of this DC brushless motor. The induced voltage is completely synchronized with the rotation of the rotor. When this induced voltage is integrated, such a signal having a phase shifted by 90 degrees from the phase of this induced voltage is obtained. When this phase shift signal is triggered at zero cross points by employing a comparator, a pulse signal which is turned ON/OFF and OFF/ON every 180 degrees is produced. This pulse signal can be employed as a rotation position signal. It should be understood that the above-explained energizing operation is performed with respect to each of the windings that comprises the brushless motor, namely 3 windings.

Next, a drive signal of the motor is produced in synchronism with ON/OFF of the above-described rotation position signal to drive this DC brushless motor, if the motor current is small. When a current flows through the motor, a phase of a terminal voltage is not made coincident with a phase of an induced voltage due to an inductance component of this motor. Moreover, this phase difference is changed in response to the motor current. As a result, the phase of the rotation position signal is corrected in response to variations of the motor current. Thus rotation position sensors are no longer required in brushless motors. The above-described Japanese patent publications describe the concrete methods more in detail.

On the other hand, in the magnetic bearing mounted rotating machines, in particular, in the high-speed super critical rotating machines the vibrations caused by the unbalance must be suppressed in order to operate the rotating machines at speeds over the critical speed. To this end, when the magnetic bearing is employed, data corresponding to the rotation speed of the motor is required to control the magnetic bearing, and thus either the rotation position sensor or the rotation speed sensor is still employed for the magnetic bearing. When a rotation angle sensor is newly mounted on a highspeed rotor, a length of this highspeed rotor along a shaft direction thereof has to be extended, which may cause lowering a critical speed. Under such a circumstance, it is desirable to use information related to rotation position owned by a motor without newly employing a rotational speed sensor, or a rotation angle sensor. However, none of the above-described Japanese publication could satisfy this desirable aspect.

SUMMARY OF THE INVENTION

The present invention has been made to solve the above-described problems, and therefore, has an object to provide a low-cost magnetic bearing and also a highspeed rotating machine supported by this magnetic bearing, without employing a rotation position sensor.

Another object of the present invention is to provide a magnetic bearing operable under stable condition in a sense of vibration engineering and also a rotating machine mounting such a stable magnetic bearing, without employing a rotation position sensor.

A further object of the present invention is to provide a compact magnetic bearing and also a rotating machine mounting such a compact magnetic bearing, without employing a rotation position sensor.

A still further object of the present invention is to provide a long-life magnetic bearing with high reliability, and also a rotating machine mounting such a long-life magnetic bearing, without using a rotation position sensor.

To achieve the above-described objects, a magnetic bearing, according to a first aspect of the present invention, is featured by such a magnetic bearing for rotating/supporting a rotor driven by a DC brushless motor, comprising; a magnetic bearing control circuit for entering thereinto a rotation position signal in response to an induction voltage of the DC brushless motor, and for frequency-dividing the rotation position signal to produce a control signal of the magnetic bearing. Also, preferably, the DC brushless motor owns three-phase windings; and the induced voltage is produced by employing a terminal voltage of each winding of the three-phase windings and a value of a phase current of each of the three-phase windings. Also, the DC brushless motor owns three-phase windings; and the rotation position signal is produced from a phase difference between a terminal voltage of each winding of the DC brushless motor and the induced voltage.

Also, to achieve the above-described objects, a rotating machine, according to a second aspect of the present invention, is featured by such a rotating machine including a rotor and a DC brushless motor for rotary-driving the rotor, and mounting a pair of radial magnetic bearings for rotatably supporting the rotor, comprising: a motor control circuit for controlling the DC brushless motor; means provided in the motor control circuit, for detecting a rotation position of the motor; and a magnetic bearing control circuit for applying a control voltage to the magnetic bearing in response to the rotation position signal.

Then, preferably, the motor control circuit calculates a phase difference between terminal voltages and an induced voltage based upon currents of the windings, and outputs the rotation position signal based upon the phase difference. Also, the magnetic bearing control circuit frequency-divides the rotation position signal, and applies a control voltage to the magnetic bearing every the frequency-divided timing. Further, the rotation position signal is produced 1 time, or 6 times every time the rotor is rotated during a 1 time period.

To achieve the above-described objects, a rotating machine, according to a third aspect of the present invention, is featured by such a rotating machine comprising: a rotor of a DC brushless motor having a permanent magnet rotor; centrifugal impellers mounted on both shaft end portions of the rotor; a pair of radial magnetic bearing and an axial magnetic bearing that rotatably support the rotor and are mounted on the rotating machine; magnetic bearing control means for controlling the radial magnetic bearing and the axial magnetic bearing; rotation position detecting means for producing a 1-pulse signal per 1-rotation of the rotor as a rotation signal from an induced voltage induced from three-phase windings of the motor gained from a winding current of the winding and a terminal voltage of the winding; and means for entering the rotation signal produced from the rotation position detecting means into the magnetic bearing control means.

To achieve the above-explained objects, a rotating machine driving method, according to the fourth aspect of the present invention, is featured by such a driving method by using a motor having a permanent magnet rotor rotatably supported by a magnetic bearing, comprising the steps of: acquiring a pulse signal synchronized with a rotation of a rotor from an induced voltage of the motor, which is generated by rotating the permanent magnet rotor, so as to identify a rotation position of the rotor; frequency-dividing the pulse signal by using a PLL (phase-locked loop) to further identify a detailed rotation position of the rotor; and producing bearing electromagnetic force in the magnetic bearing by employing a sine function and a cosine function, which correspond to the detailed rotation position in the identifying step.

Then, the rotating machine driving method is further comprised of a step of generating an electromagnetic force to the magnetic bearing to cancel an unbalance force acting on the rotor with a feed forward control or a feed back control.

BRIEF DESCRIPTION OF THE DRAWINGS

For a better understanding of the present invention, reference is made of a detailed description to be read in conjunction with the accompanying drawings, in which:

FIG. 8 is a schematic block diagram for representing a PLL circuit in case of getting an information of 6 pulses per 1-rotation.

DESCRIPTION OF THE PREFERRED EMBODIMENTS

Figure 1:
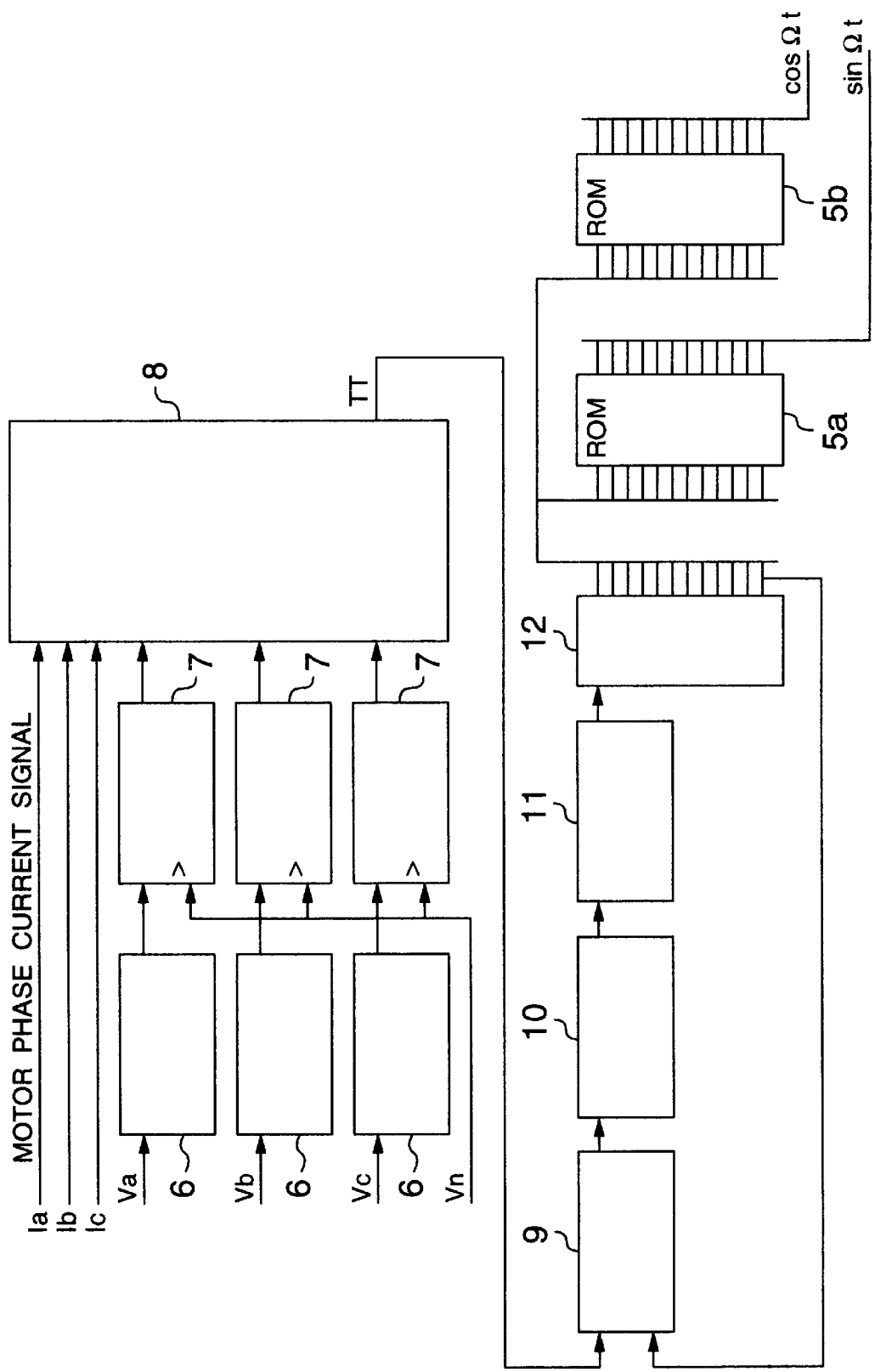
FIG. 1 is a schematic block diagram for representing a rotation position detecting function of a drive circuit of a DC brushless motor, according to an embodiment of the present invention.

In a small flow rate turbo compressor, it is required to be driven in a high speed so as to increase an efficiency. To achieve such a highspeed rotation, when a impeller is directly coupled to a motor to constitute a 1-stage compressor, or a 2-stage compressor, the motor necessarily requires a highspeed switching inverter. As highspeed motors, there are an induction motor, a reluctance motor, and a DC brushless motor. DC brushless motors are popularly employed, taking account of an efficiency and a power factor. Either a fluid bearing or a magnetic bearing is suitable in order to support a rotor of such a highspeed rotating machine. However, the magnetic bearing owns superior characteristics as to such an aspect that shaft vibrations can be effectively suppressed.

In a DC motor, a current supplying phase is switched in correspondence with a magnetic pole position (namely, N-pole and S-pole) of a permanent magnet rotor so as to produce rotation torque. Basically, it is desirable that a phase of a basic wave of a motor current is made with an in-phase relationship with a phase of an induced voltage generated in a phase when the motor is rotated. In a motor equipped with a brush, a current is automatically switched by the brush. Therefore, this motor equipped with the brush has such a merit that a control circuit can be made simple. However, this motor owns such a demerit that the sliding operation of the brush unit is not suitable for the highspeed rotation, resulting in deterioration of the maintenance aspect.

Since a brushless motor owns no brush, a rotation position of a rotating shaft is detected by employing a sensor, and a phase at which a current is supplied is switched. As a consequence, no sliding unit is provided. Since a low flow rate turbo-compressing machine is rotated in a high speed, the most of such a low flow rate turbo-compressing machine employs a brushless motor. A rotation position sensor in the brushless motor is required to have a sufficient capability for withstanding highspeed operations, and also components equipped on a rotor of this brushless motor is required to own a sufficient strength capable of withstanding centrifugal force. In a compressing machine where a impeller is mounted on an end portion of a motor shaft, more specifically, in a two-staged compressor where impellers are mounted on both end portions of a motor shaft, an improvement in shaft stiffness cannot be highly expected. Therefore, such a high speed turbo compressor is driven beyond a third critical speed in most cases. A magnetic bearing employed in such a centrifugal compressor must suppress shaft vibrations at the critical speeds.

To pass the critical speed, an electromagnetic force of a bearing capable for canceling unbalance force has to be produced. Then, a magnitude of an unbalance force, and either a direction of this unbalance force or a phase thereof should be acquired by utilizing a proper method. Since the unbalance force corresponds to a periodic disturbance having a frequency equal to a rotation frequency, a sinuous wave command having an opposite phase to this disturbance is added to a control command of a magnetic bearing. This method is so-called the feed-forward type unbalance vibration suppressing method.

In general, a phase difference between unbalance force and unbalance vibration displacement becomes 90 degrees at a critical speed. Only a frequency component of a rotation frequency is extracted from a radial displacement signal. Then, this extracted frequency component is shifted by 90 degrees phase lead, and the phase-shifted frequency component is fed back, so that the unbalance force can be canceled. This method corresponds to the feedback type unbalance vibration suppressing method.

To shift a phase by 90 degrees to lead direction, either a differentiator or a phase leading device is formed by using an operational amplifier. Alternatively, signals from sensors that are positioned perpendicular to each other and are used to measure radial displacement are fed back in a cross-coupling manner so as to produce a 90-degree phase leading signal in the geometrical manner. This method is a so-called "N cross feedback" method.

Furthermore, the following idea has been currently proposed. That is, in the magnetic bearing for supporting the rotor rotated in the high speed, a component in the current having a frequency coincident with rotation frequency is eliminated in order to reduce the bearing current at the rated speed.

Since the rotation frequency of the rotor is the absolute necessary item in any of the above-described methods, this rotation frequency is required to be calculated by using any of these methods. A description will now be made of a basic idea for a method capable of calculating this rotation frequency to control the magnetic bearing.

Under unbalance vibration control of a magnetic bearing, magnetic force (absorption force) is adjusted in fit with a rotation position of the rotor, so that the unbalance force is counter acted by this magnetic force. In order to acquire information about a rotation position, a rotating pulse pickup 22 is mounted on a rotor to acquire a pulse signal (namely, 1 pulse/1 rotation) in synchronism with a rotation of this rotor. This pulse signal is subdivided by using a PLL logic, so that such a rotation position signal having high resolution may be produced. When this rotation position signal is used, it is possible to generate a sinusoidal magnetic force in correspondence with the rotation position. Then, if this sinusoidal magnetic force may have such a phase opposite to that of the unbalance force, the unbalance vibration can be reduced.

In accordance with the present invention, a rotation position signal obtained from a terminal voltage of a motor is used as a pulse signal of a magnetic bearing while a rotating pulse pickup is not required. As a consequence, neither a rotation position sensor nor a rotation speed sensor dedicated to the magnetic bearing, is required. Furthermore, when the terminal voltage of the motor is filtered so as to eliminate a ripple component contained in this terminal voltage, and the filtered terminal voltage is compared with a zero potential at a comparator, such a pulse signal having a duty ratio of 1:1 is produced. This pulse signal corresponds to a signal synchronized with a rotation of the rotor. This pulse signal is divided by using a PLL (phase-locked loop) circuit so as to increase a total pulse number. Thus, this divided signal is used as a rotation position signal having high resolution. While both a sine function and a cosine function are calculated in correspondence with this rotation position of the high resolution, an unbalance control system for a magnetic bearing control apparatus is constituted.

Figure 2:
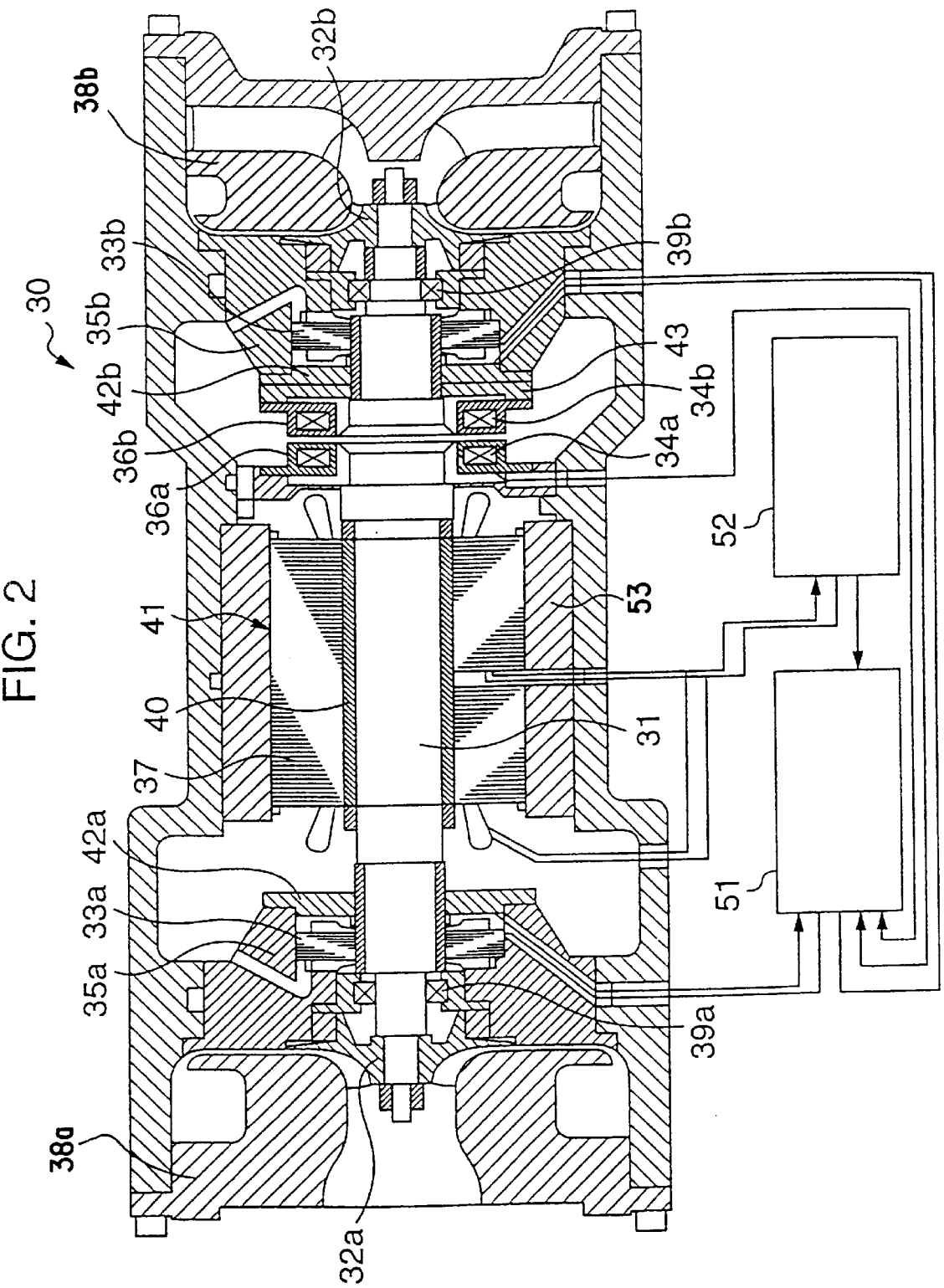
FIG. 2 is a cross-sectional view for showing a rotating machine mounting a magnetic bearing, according to an embodiment of the present invention.

Referring now to a drawing, a rotating machine of an embodiment of the present invention will be explained. FIG. 2 is a cross-sectional view showing a rotation unit of a 2-stage centrifugal compressor corresponding to an example of the rotating machine according to the present invention. In the 2-stage centrifugal compressor 30, a first-stage centrifugal impeller 32a and a second-stage centrifugal impeller 32b are directly mounted on both end portions of a rotor 31 of a motor 41. Radial magnetic bearings 33a and 33b are arranged on this rotor 31 inside the mounting positions of both the centrifugal impellers 32a and 32b. Thus, the rotor 31 is rotatably supported by these radial bearings 33a and 33b. Radial sensors 42a and 42b for measuring displacement (X1, Y1) and (Xr, Yr) of the rotor 31 along the radial direction are mounted on the respective radial magnetic bearings 33a and 33b.

Also, at the inside of the radial magnetic bearing 33b along the axial direction located on the side of the second-stage impeller 32b positioned at the right side of FIG. 2, axial magnetic bearings 34a and 34b are arranged in such a manner that these axial magnetic bearings 34a and 34b sandwich a thrust disk provided on the rotor 31. These axial magnetic bearings 34a and 34b can support thrust force produced in this two-stage compressor along the shaft direction. An axial sensor 43 is provided also on this thrust bearing in order to detect displacement Z of the rotor 31 along the axial direction. The radial magnetic bearings 33a and 33b are fixed on bearing housings 35a and 35b respectively, whereas the axial magnetic bearings 34a and 34b are fixed on bearing holders 36a and 36b respectively.

In the rotor 31, a motor rotor unit having a permanent magnet rotor 40 is formed at a center portion of this rotor 31, and a motor stator 37 surrounds this rotor unit with keeping a small gap. The brushless motor 41 is constituted by this motor stator 37, the motor rotor unit, and a control circuit (not shown). The motor stator 37 is held in a stator housing 53 provided on a motor casing.

The centrifugal impellers 32a and 32b which are directly mounted on both end portions of the rotor 31 are open shroud impellers having no shroud wall. A very small clearance is formed between a shroud surface of each of the open shroud impellers 32a, 32b, and each of inner casings 38a, 38b. Auxiliary bearings 39a and 39b are provided outside of the radial magnetic bearings 33a and 33b along the axial direction in order to avoid that the rotor 31 contact with the stator unit and the casing during the magnetic bearings being unenergized. When the compressor is driven, the rotor 31 is floated by the radial magnetic bearings 33a and 33b. The rotation of the rotor 31 is controlled without any contact between the these auxiliary bearings 39a, 39b and the rotor 31. A gap formed between the auxiliary bearings 39a, 39b and the rotor 31 is smaller than the air gaps of the motor and the radial magnetic bearings 33a, 33b, and also smaller than the shroud gap of the impellers.

The outputs from the radial sensors 42a, 42b, and the output from the axial sensor 43 are input into a magnetic bearing control circuit 51. This magnetic bearing control circuit 51 outputs voltages to the respective radial magnetic bearings 33a, 33b and the respective axial magnetic bearings 34a, 34b so as to control these magnetic bearings. The terminal voltages of the windings of the respective phases of the motor stator 37 are applied to the motor control circuit 52. A current used to drive the motor is output from the motor control circuit 52 to the motor stator. As will be discussed later, a control signal is supplied from the motor control circuit 52 to the magnetic bearing control circuit 51.

Figure 3:
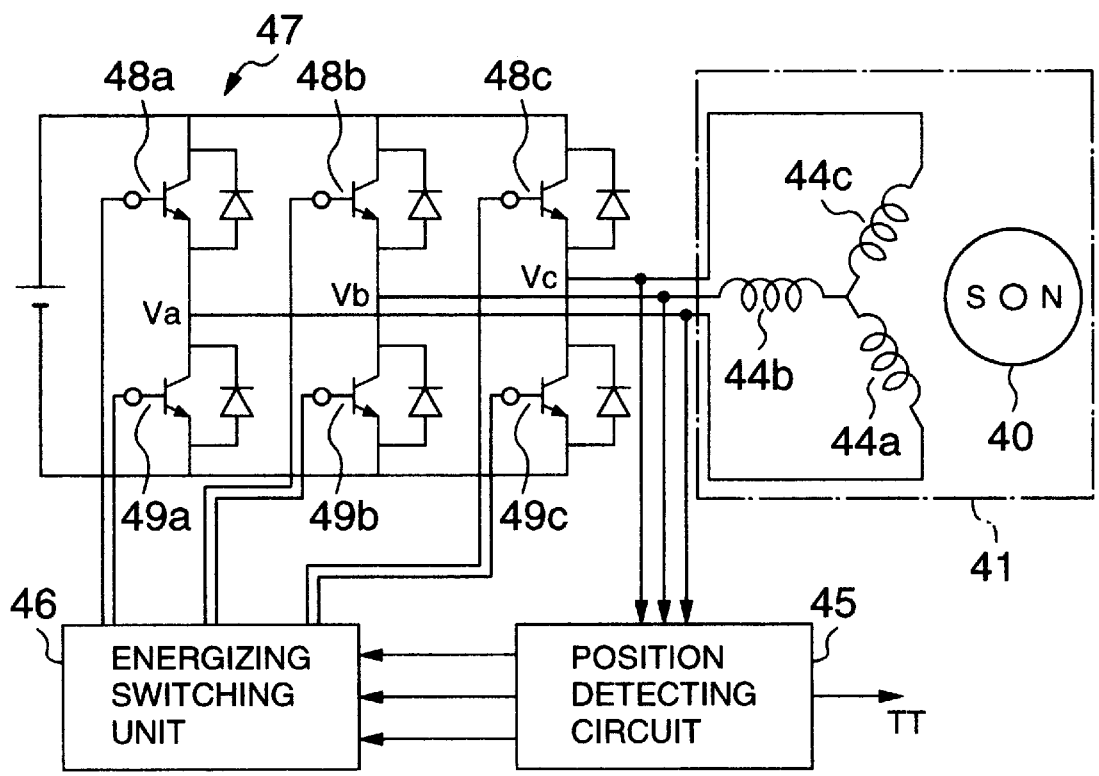
FIG. 3 is the drive circuit of the DC brushless motor.

Next, the brushless motor 41 employed in the two-stage centrifugal compressor 30 constituted by the above-described structure will now be explained in detail. FIG. 3 represents an example of the generalpurpose drive circuit for the 3-phase DC brushless motor 41. In response to either a rotation position of this DC brushless motor or a load condition, a power switch is turned ON/OFF in accordance with, for example, a 120-degree energizing method so as to supply currents to each phase, namely phase-a, phase-b, and phase-c. A drive unit of the DC brushless motor 41 contains an inverter unit 47, an energizing switching unit for instructing the energizing switching operation of this inverter unit 47, and a position detecting unit 45. This position detecting unit 45 detects the circumferential position of the rotor 40 with the permanent magnet from the voltage induced in the motor 41 for the switching signal. The inverter unit 47 drives switching modules 48a, 48b, 48c and switching modules 49a, 49b, 49c, which are constituted by switching transistors and diodes, in response to the switching timing applied to the respective windings 44a, 44b, 44c of the motor, which are instructed from the switching unit 46. For example, in the 120-degree switching method, a positive (plus) voltage has been applied to the winding 44a of the phase-a during an interval substantially equal to 120 degrees of the rotation angle of the rotor 31. Then, this positive voltage is stopped during an interval substantially equal to the rotation angle of 60 degrees, and thereafter a negative (minus) voltage is applied during an interval substantially equal to the rotation angle of 120 degrees. Subsequently, the apply of this negative voltage is stopped during an interval substantially equal to the rotation angle of 60 degrees. The above-explained energizing method is similarly applied also to the phase-b and the phase-c. It should be noted that the energizing timing to the respective three phases, namely phase-a, phase-b, and phase-c is shifted by 120 degrees. Consequently, the rotating magnetic field is generated to drive the brushless motor 41.

Next, FIG. 1 shows a detailed circuit arrangement of the position detecting circuit 45 shown in FIG. 3. FIG. 1 is a block diagram of the rotation position detecter. In this drawing, a rotation position signal for a magnetic bearing is produced based upon a terminal voltage of the DC brushless motor 41.

Phase terminal voltages Va, Vb, Vc of the DC brushless motor 41 are applied to integrators 6 provided for the respective phases so as to be integrated. Since these phase terminal voltages Va, Vb, Vc are integrated by the integrators 6, the phases of these terminal voltages Va, Vb, Vc are shifted by 90 degrees, and ripple components of higher harmonic waves produced by the pulse width modulation (PWM) are removed. As a result, the resultant terminal voltages become substantially sinusoidal voltage signals. In this case, if such a simple integration process for integrating all of the signal components is carried out by the integrator 6, a very low DC voltage would be amplified with meaningless. To avoid such a disadvantage, a high-pass filter for cutting off the DC voltages is provided with the integrator 6. The signal processed by the integrator 6 is compared with a neutral potential Vn of the phase terminals Va, Vb, Vc by a comparator 7. Consequently, such a pulse signal having a duty ratio of 1:1 is obtained which is turned ON/OFF at a zerocross point. In this case, a duty ratio is equal to a ratio of ON-time and OFF-time. The pulse signal is obtained in the respective phases similarly. These pulse signals are shifted by 120 degrees from each other. Then, these pulse signals are used as the rotation position information to control the DC brushless motor and the magnetic bearings.

Figure 4:
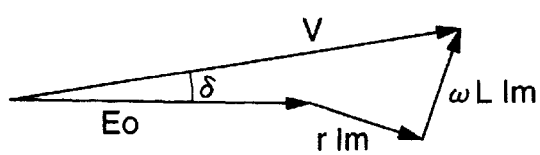
FIG. 4 is an explanatory diagram for explaining a relationship between an induced voltage of a DC motor and a terminal voltage thereof.

As a pulse signal is originated from a phase terminal voltage, the phase of which is varied with a phase current of the DC brushless motor. A rotation position pulse signal is directly varied in connection with a phase terminal voltage, so that a rotation position of a motor cannot be specified. Thus, it is required to modify such a pulse signal based upon a phase current of the DC brushless motor. Referring now to FIG. 4, a modifying method using a phase current will be described. A phase terminal voltage V is expressed with a vector sum of an induced voltage vector E0 and an impedance drop vector. This impedance drop vector is produced from a phase current Im flowing through a phase resistor "γ" and a phase inductance "L". In other words, the induced voltage E0 is equal to a vector difference between the phase terminal V and the impedance drop. After calculating a phase difference "δ" between the phase terminal voltage and the induced voltage E0, the phase difference is subtracted from the phase of the phase voltage V, so that the phase of the induced voltage E0, namely rotation angle information can be obtained.

A phase corrector 8 shown in FIG. 1 is used to calculate this phase difference "δ", and corrects the phase of the rotation position pulse signal based on the calculated phase difference "δ". Such a pulse signal whose phase is made coincident with the phase of the induced voltage is obtained irrespective of the motor current value. In the inverter unit for controlling the motor current, the switching operation of the switching modules are carried out in response to the rotation position signal whose phase is corrected by the phase corrector 8.

To control an unbalance vibration possibly occurred in a magnetic bearing system, a signal "TT" is required. This signal "TT" is output by at least 1 pulse/1 rotation of the rotor 31. The phase corrector 8 may provide such a signal suitable for controlling this magnetic bearing. Then, one of the 3-phase pulse signals whose phases are corrected may be employed so as to control the magnetic bearing as the signal "TT".

In the unbalance vibration control using the magnetic bearing, the magnetic force is adjusted in correspondence with the rotation position of the rotor. The signal "TT" produced as 1 pulse/1 rotation is divided by a PLL (phased-locked loop) circuit so as to produce rotation position signals which are subdivided in the very fine mode. In the phase comparator 9, the pulse signal "TT", obtained from the phase corrector 8 is compared with the most significant bit (MSB) of the counter 12 to calculate frequency difference and phase difference. A low-pass filter (LPF) 10 filers the frequency difference and the phase difference output from the phase comparator 9. A voltage-controlled oscillator (VCO) 11 generates a signal in response to the output voltage of this LPF 10. The signal generated in the VCO 11 is counted by a counter 12, and the most significant bit of this counted signal is fed back to the phase comparator 9.

These circuit components are identical to the ordinal PLL circuit. It should also be noted that the signal "TT" produced as the 1 pulse/1 rotation is subdivided into the bit number of the counter. For instance, when the counter 12 is a 12-bit counter, the signal "TT" produced as the 1 pulse/1 rotation is subdivided into $2^{12}$=4,096 signals.

To suppress an unbalance vibration of a rotor, force may be applied to this rotor in such a manner that this unbalance vibration can be canceled. That is, this vibration suppression may be realized by applying the vibration canceling force from the magnetic bearing as the electromagnetic force of the bearing, and this electromagnetic force is varied in a sine wave form. The application of this vibration suppressing force will now be described more in detail with reference to FIG. 1. A sine wave and a cosine wave during 1 time period are subdivided by the number equal to the dividing number of the counter 12. The values of the sine wave and the values of the cosine wave at the respective subdivided positions are previously stored into read-only memories (ROMs) 5a and 5b. When the addresses of the ROMs 5a and 5b are referred in response to the output from the counter 12, such a sinusoidal signal synchronized with the rotation of the rotor, namely the unbalance vibration is obtained. In this case, when the counter 12 is a 12-bit counter, such data obtained by dividing the sine wave and the cosine wave for 1 time period by 4,096 may be stored into the ROMs 5a and 5b. It should be understood that the values of the sine wave and of the cosine wave are previously stored into the ROMs 5a and 5b in the above-described embodiment. Alternatively, values of the sine wave and of the cosine wave at the respective subdivision positions of the counter may be calculated on real time.

Figure 5:
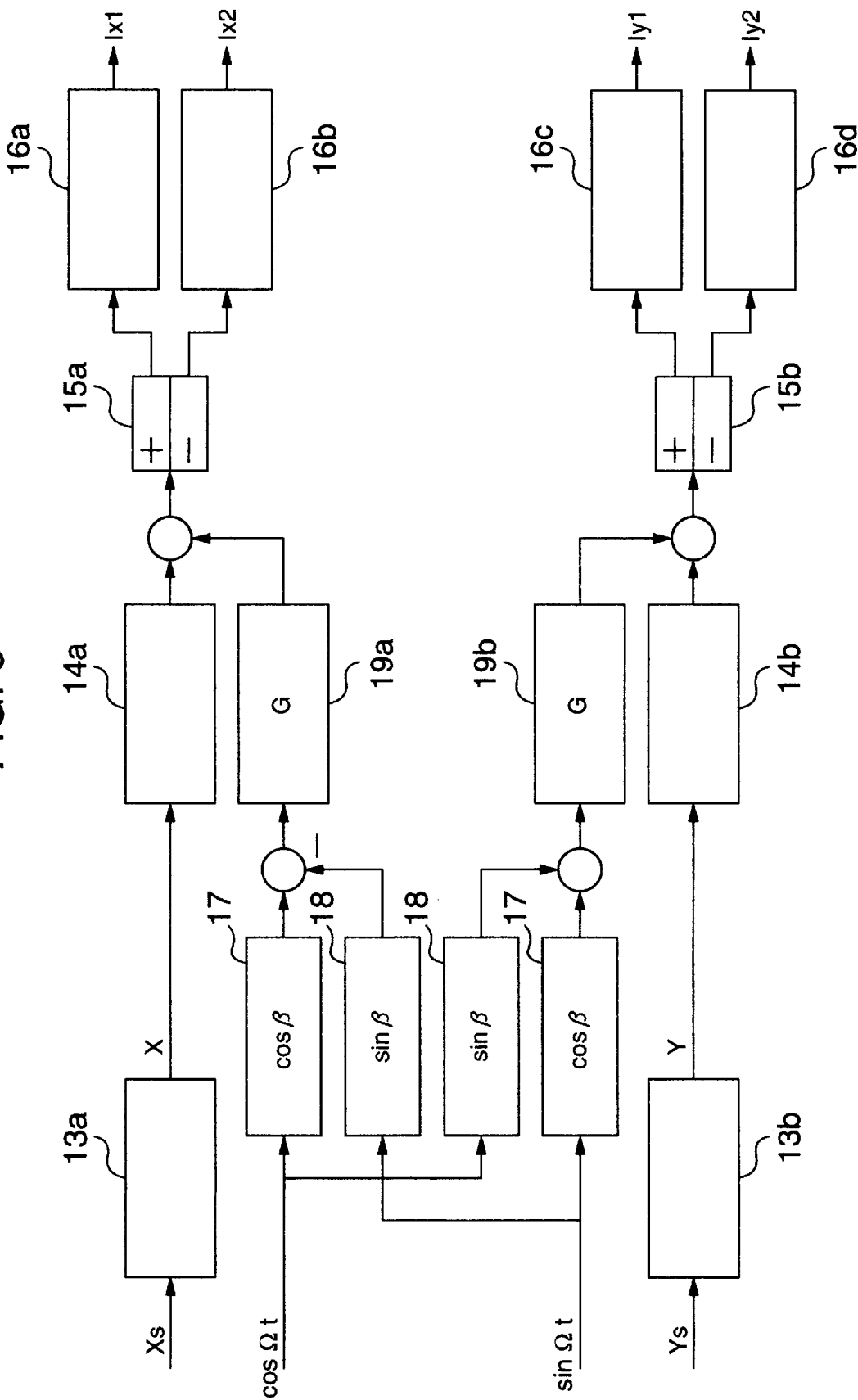
FIG. 5 is a schematic block diagram for representing a radial magnetic bearing control system equipped with a feed-forward type unbalance control, according to an embodiment of the present invention.

FIG. 5 represents an example of a control system in which the above-described control method is applied to a radial magnetic bearing mounted on a rotating machine. FIG. 5 is a schematic block diagram of a radial magnetic bearing control system for 2 axis, to which the feed-forward type unbalance control is applied. An axis-X sensor's signal "Xs" and a axis-Y sensor's signal "Ys" derived from a radial sensor which can detect displacement of the rotor along the radial direction are converted into a displacement signal X and a displacement signal Y in signal converters 13a and 13b. The converted displacement signals X and Y are input to control circuits 14a and 14b. In response to the input displacement signals X and Y, the control circuits 14a and 14b execute the control/calculation operations such as the PID control and the phase lead control to thereby produce a command of a power amplifier required to drive an electromagnet of a bearing.

The commands of the power amplifier 16a, 16b, 16c, 16d calculated by the control circuits 14a and 14b are separated into two commands by switching devices 15a and 15b in response to a positive code and a negative code. Both the positive signal and the negative signal separated from the commands constitute one pair of commands of the power amplifier 16a, 16b, 16c, 16d. In the ordinary power amplifier, a bias current is supplied to the power amplifier, if required. As a result, the linearity of the absorbing force produced from the electromagnet of the radial bearing may be improved. These circuits do not consider the unbalance control.

To execute the unbalance control, a sin Ωt signal and a cos Ωt signal obtained from the ROMs 5a and 5b are added to the output signals of the control circuits 14a and 14b. In this case, symbol "Ω" indicates a rotation angle velocity, and symbol "t" shows time. Since a magnitude of unbalance force and a phase thereof are different from each other depending upon a machine to be controlled, both the phase and the force are adjusted with respect to each machine to be controlled. In a block 17 of a constant "cos β" and a block 18 of a constant "sin β", the phase of the sin Ωt signal and the phase of the cos Ωt signal are adjusted. These signals are convoluted to obtain sin (Ωt+β) and cos (Ωt+β). In this control system, the phase "β" is adjusted in order that it coincides with the phase difference between the induced voltage of the motor and the unbalance force. The magnitude of the unbalance force is adjusted in a block of a constant G.

Figure 6:
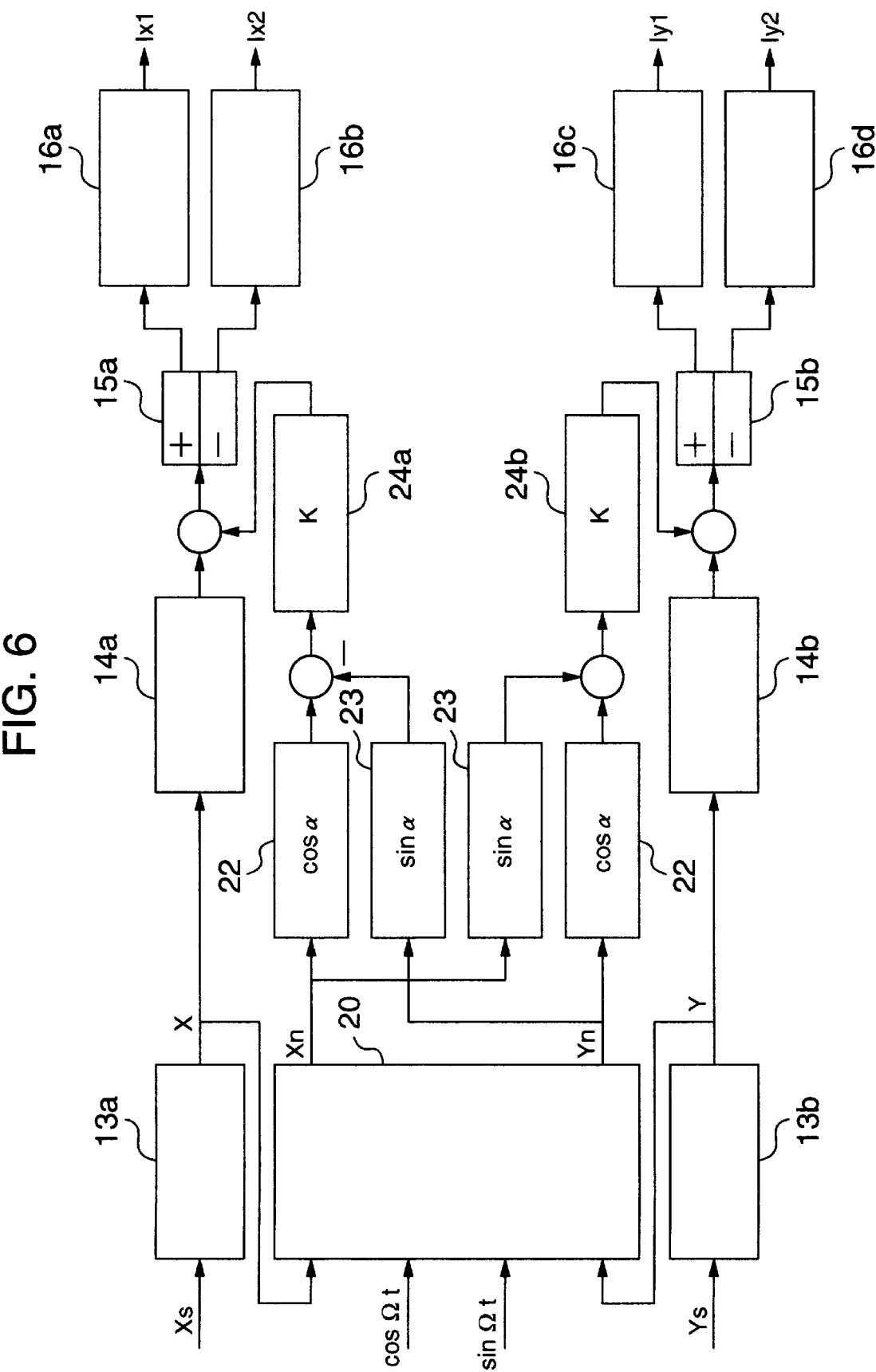
FIG. 6 is a schematic block diagram for showing a radial magnetic bearing control system equipped with a feedback type unbalance control, according to an embodiment of the present invention.

The feedback type unbalance control corresponding to another unbalance control method applied to the magnetic bearing will now be explained with reference to FIG. 6. FIG. 6 is a schematic block diagram for showing a radial magnetic bearing control system capable of controlling two axis. Only a frequency component of unbalance vibrations is extracted from a displacement signal X and a signal Y to be fed back. A tracking filter 20 is used to extract the frequency component of the unbalance vibrations. The tracking filter 20 is a band-pass filter. The frequency to be filtered by this band-pass filter is always trying to make coincident with the frequency of the rotation speed of the rotor.

To drive this tracking filter 20, both a sine wave and a cosine wave are required, which own the same time periods as the rotation speed of the rotor. In this embodiment, as previously described, since both the sin Ωt signal and the cos Ωt signal are obtained from the ROMs 5a and 5b, the resulting sin Ωt signal and cos Ωt signal are employed.

Figure 7:
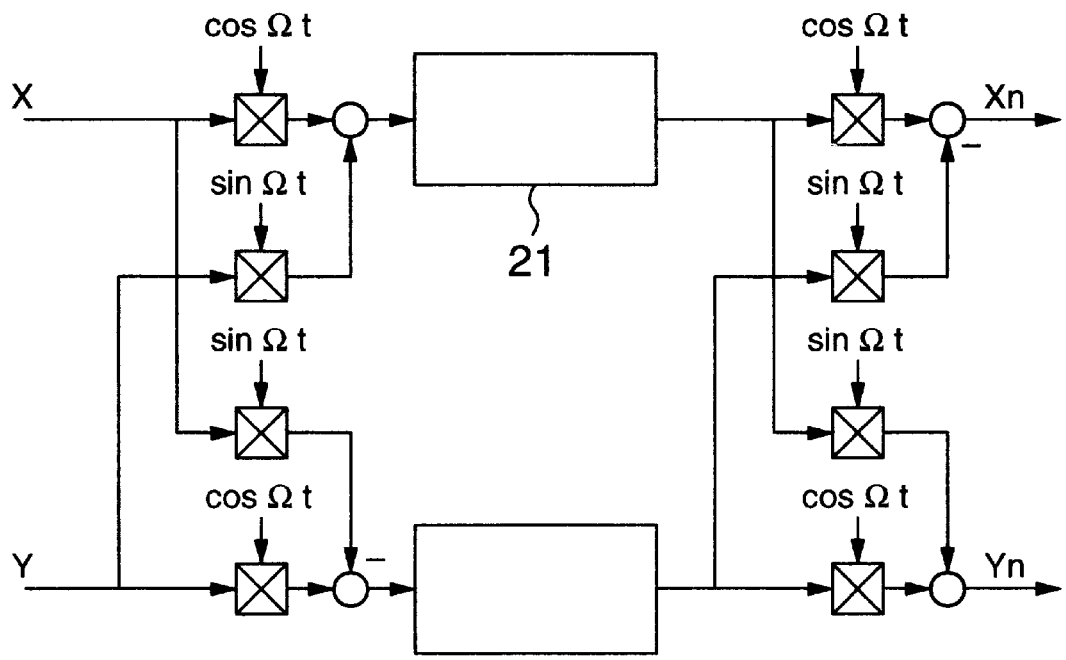
FIG. 7 is a schematic block diagram for indicating a tracking filter employed in a control apparatus of the magnetic bearing according to the present invention.

A detail of the tracking filter 20 is shown in FIG. 7. In the beginning, a vector calculation is made between the displacement signals (X, Y) and the trigonometric function signals (cos Ωt,—sin Ωt). This vector calculation is expressed by the below-mentioned expressions:

$$A = X \cdot \cos \Omega t + Y \cdot \sin \Omega t$$

$$B = Y \cdot \cos \Omega t - X \cdot \sin \Omega t$$

The calculation result (A, B) is input into a low-pass filter 21 so as to derive only a DC component (A0, B0). This DC component is an amplitude of a forward rotation synchronization component contained in the displacement signals X and Y. This DC component is further vector-calculated with (cos Ωt, sin Ωt) so as to extract only the forward rotation synchronization component contained in the displacement signals X and Y. Assuming now that this extracted signal is recognized as (Xn, Yn), this signal is expressed by the following expressions:

$$Xn = A0 \cdot \cos \Omega t - B0 \cdot \sin \Omega t$$

$$Yn = B0 \cdot \cos \Omega t + A0 \cdot \sin \Omega t$$

An adjusting gain (Kcos α, Ksin α) is multiplied by this rotation synchronization component (Xn, Yn), then the multiplication result is added to the outputs from the control circuits 14a and 14b. This is a basic arrangement of the feedback control system with respect to the unbalance vibrations.

In the above-described explanation, the phase corrector 8 provides one of the 3-phase pulse signals to the magnetic bearing. The pulse signal "TT" equal to the 1 pulse/1 rotation signal is input into the PLL circuit for controlling the magnetic bearing. This pulse signal is divided by a large number of subdivisions, so that very fine-divided rotation position signals are produced.

There are possibilities that the PLL circuit could not be operated under better condition using the 1-pulse/1-rotation signal, such as a fast change occurring in rotation speeds, or a low-speed machine. In this case, all of the position detection signals obtained from the induced voltage are used so as to obtain a 6-pulse/1-rotation signal. Then, this 6-pulse/1-rotation signal is frequency-divided by a PLL circuit to use this frequency-divided 6-pulse/1-rotation signal. The method for producing such a 6-pulse/1-rotation pulse is realized as follows. A pulse signal obtained from the comparator 7 owns a duty ratio of 1:1. Thus, the pulse signal is triggered at the rising edge of the pulse signal and the falling edge of the pulse signal. When the trigger circuit is added to the PLL circuit, a 2-pulse/1-rotation signal may be produced with respect to each of the three phases. Since the respective phases are shifted by 120 degrees from each other, the pulse signal is triggered at the rising edge of this pulse signal and the falling edge thereof in all of three phases. Then, 6 pulse signals per 1 rotation are obtained. When a total pulse number of the pulse signal is increased 6 times, the response characteristic of the PLL circuit can be improved 6 times.

In the PLL circuit for controlling the magnetic bearing, this 6-pulse/1-rotation pulse signal TT is frequency-divided to produce address signals used in the ROMs 5a and 5b. Similar to the above-described embodiment, if a 12-bit counter 12 is employed, only ⅙ of the capacity of this counter 12 per 1 signal can be used to store the sine wave information and the cosine wave information as to all of 6 signals. Because, the maximum address number of the counter 12 is equal to 4,096. Since the bit number of the counter is the binary number, the counter capacity becomes ⅛ most nearly equal to ⅙ counter capacity per 1 signal. That is to say, 12 bits of the 12-bit counter can be used when the 1-pulse/1-rotation signal is input, whereas only 9 bits of the 12-bit counter may be used when the 6-pulse/1-rotation signal is input.

Referring now to FIG. 8, a description will be made of counter operation when 6 pulses/rotation signal is input. The 9th bit of the counter 12 is fed back to the phase comparator 9. When the counter 12 counts $6 \times 2^9 = 3,072$ pulses, this counter 12 is reset. In other words, the counter 12 is reset every time all of the 6 pulses input from the pulse signal TT within 1 time period of the rotor. It should be understood that data which are produced by subdividing either the sine wave for 1 time period or the cosine wave for 1 time period by 3,072 are previously stored into the ROM (Read Only Memory). As previously explained, if the capacity of the counter is the same, even if the number of the input pulses per 1 time period of the rotation is increased, the frequency dividing number is not always increased. Apparently, this may constitute the rough control. However, when the pulse number per 1 time period is increased, in such a case that the speed change of the rotation becomes rapid, or the rotation speed of the rotor is very slow, the rotation information of the rotor such as the rotation speed and the rotation acceleration speed can be precisely detected. As a consequence, the rotor can be driven under stable condition.

In accordance with the present invention, the rotation position sensor is no longer required in both the magnetic bearing for supporting the rotating machine, and the DC brushless motor for driving the rotating machine. It is possible to realize the low-cost magnetic bearing as well as the low-cost rotating machine mounting this magnetic bearing. Also, since the rotation position sensor is not required, the shaft length of the rotor can be shortened, and thus the rigidity of this rotor can be increased. Moreover, since the rigidity of this rotor is improved, the critical speed of the rotor can be increased, so that the rotating machine can be driven up to the high speeds under stable condition. As a result, both the magnetic bearing and the rotating machine equipped with this magnetic bearing can be driven under maintenance free condition for a long time period. Therefore, the reliability of the magnetic bearing and the rotating machine can be improved.

What is claimed is:

1. A magnetic bearing for rotating/supporting a rotor driven by a DC brushless motor, comprising:
   a magnetic bearing control circuit for controlling the rotor driven beyond a third order critical speed at which unbalance forces may be produced, the control circuit receiving a rotation position signal based on an induced voltage of the DC brushless motor, and frequency-multiplying said rotation position signal to produce an unbalanced vibration control signal of the magnetic bearing.

2. A magnetic bearing as claimed in claim 1 wherein:
   said DC brushless motor has three-phase windings; and
   said induced voltage is produced by employing a terminal voltage of each winding of said three-phase windings and a phase current of each of said three-phase windings.

3. A magnetic bearing as claimed in claim 2 wherein:
   said DC brushless motor has three-phase windings; and
   said rotation position signal is produced from a phase difference between a terminal voltage of each winding of said DC brushless motor and said induced voltage.

4. A magnetic bearing as claimed in claim 1 wherein:

said DC brushless motor has three-phase windings; and said rotation position signal is produced from a phase difference between a terminal voltage of each winding of said DC brushless motor and said induced voltage.

5. A rotating machine including a rotor and a DC brushless motor for rotary-driving said rotor, and mounting a pair of radial magnetic bearings for rotatably supporting said rotor, comprising:

a motor control circuit for controlling said DC brushless motor;

means, provided in said motor control circuit, for detecting a rotation position of said motor and providing a rotation position signal; and a magnetic bearing control circuit for controlling the rotor driven beyond a third order critical speed at which unbalance forces may be produced, the control circuit applying a control voltage to said magnetic bearing in relation to said rotation position signal to control any unbalance forces;

said motor control circuit calculating a phase difference between a terminal voltage and an induced voltage based upon the terminal voltages of three-phase windings of said DC brushless motor and motor phase currents of said windings, and outputting the rotation position signal based upon said phase difference.

6. A rotating machine as claimed in claim 5 wherein:

said magnetic bearing control circuit time-divides said rotation position signal into a plurality of sub-signals, and applies a control voltage to said magnetic bearing every sub-signal interval.

7. A rotating machine as claimed in claim 6 wherein:

said rotation position signal is produced 1 time, or 6 times every time the rotor is rotated during a 1 time period.

8. A rotating machine as claimed in claim 5 wherein:

said rotation position signal is produced 1 time or 6 times during each rotor revolution out of the induction voltage.

9. A rotating machine, comprising:

a DC brushless motor having a permanent magnet rotor and three-phase windings;

centrifugal impellers mounted on both shaft end portions of said rotor;

a pair of radial magnetic bearings and a thrust magnetic bearing, which rotatably support said rotor and are mounted on said rotating machine;

magnetic bearing control means for controlling said radial magnetic bearings at a third order critical speed of the rotating machine at which unbalance forces of the rotor may occur, and for controlling said thrust magnetic bearing;

rotation position detecting means for calculating an induced voltage induced from said three-phase windings for rotating said rotor based upon a winding current of said winding and a terminal voltage of said winding; and for producing a 1 pulse signal per 1 rotation of said rotor based on an induced voltage of said three-phase windings as a rotational signal, wherein the induced voltage is calculated from a winding current of said windings and at a terminal voltage of said windings;

means for inputting the rotation signal produced from said rotation position detecting means into said magnetic bearing control means.

* * * * *